(No Model.)
W. CALVER.
SOLAR STOVE.
No. 412,725. Patented Oct. 15, 1889.
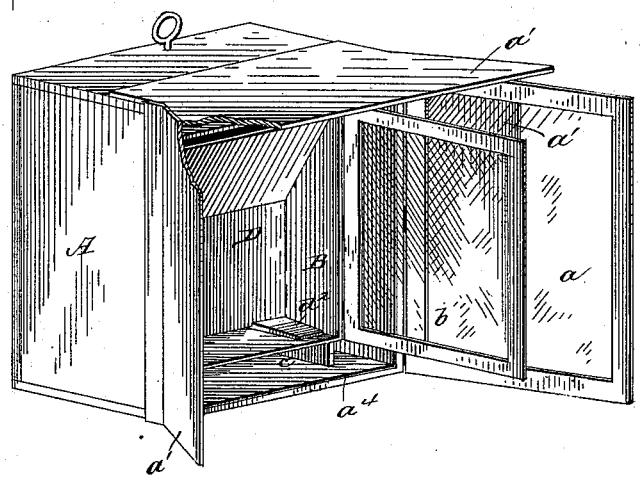
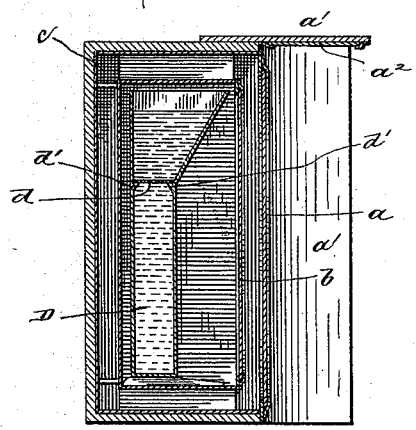
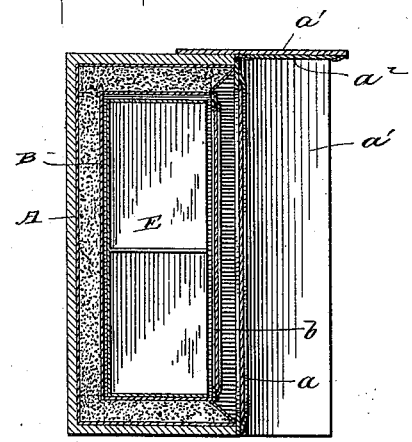
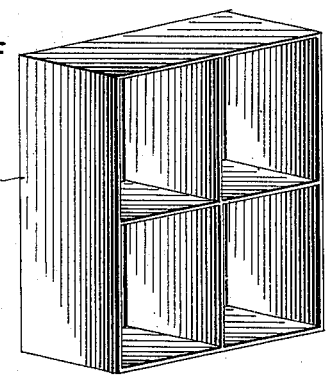
Witnesses.
E. L. Smith
Henry Calver
Inventor.
William Calver
N. PETERS, Photo-Lithographer, Washington, D. C.

UNITED STATES PATENT OFFICE.

WILLIAM CALVER, OF WASHINGTON, DISTRICT OF COLUMBIA.

SOLAR STOVE.

SPECIFICATION forming part of Letters Patent No. 412,725, dated October 15, 1889.

Application filed December 31, 1888. Serial No. 294,993. (No model.)

*To all whom it may concern:*

Be it known that I, WILLIAM CALVER, a citizen of the United States, residing at Washington, District of Columbia, have invented certain new and useful Improvements in Solar Stoves, of which the following is a specification, reference being had therein to the accompanying drawings.

The object of my invention is to provide a solar stove which will be suitable for domestic use, and which will be of such construction as to receive and retain the heat of concentrated solar rays to enable the same to be conveniently utilized, this solar stove to be heated by solar rays concentrated or collected by means of reflecting apparatus, such as is shown by my patents, Nos. 260,657, 290,852, 291,146, 291,491, and 294,117, or other suitable appliances.

To this end my improved solar stove consists of a box of metal or other heat-resisting or non-combustible material inclosed within another box, which may be of wood, stone, or metal, the inner box being considerably smaller than the outer box, so as to leave an air or packing space between them. Both boxes are provided in front with sliding or swinging doors, which are preferably transparent, although the doors may be of opaque material and the rear side of the box be transparent for the admission of the heat-rays, if desired. The space between the inner and outer boxes may be filled with gypsum or other non-conducting material, or it may be simply an air-space, according to the degree of heat for which the stove is to be used.

For interchangeable use with my improved solar stove, I provide a boiler and an oven, either of which can be placed in the stove, as may be desired.

In the accompanying drawings, Figure 1 is a perspective view of my improved solar stove with the doors thereof open and the boiler inside. Figs. 2 and 3 are vertical sections of the same with the doors closed, Fig. 2 showing the stove containing the boiler, and Fig. 3 the oven. Fig. 4 is a detail perspective view of the oven.

A denotes the outer box, which is preferably of wood, (lined with sheet metal or other incombustible material $a^4$,) for lightness and cheapness, but which may be entirely of stone or metal, if desired.

B is the inner box, which is preferably of sheet metal. The inner box is smaller than the outer box, so as to leave a considerable space $c$ between the two, and the space may be simply an air-space, as shown in Fig. 2, or it may be filled with any suitable packing—as gypsum, or other heat-resisting non-conducting material—as indicated by Fig. 3.

For convenient access to the interior of the inner box B, both boxes are provided with sliding or swinging doors $a$ $b$. As it is necessary that the stove should be transparent on one side for the admission of heat-rays, the doors are preferably of transparent material, which may be mica or glass, mica being considered best for the door $b$ of the inner box and glass for the door $a$ of the outer box.

The outer box A is preferably provided in front or on its transparent side with extensions $a'$ at its top and sides, the top extension preferably having on its inner side a mirror-facing $a^2$. These top and side extensions serve to prevent the dispersion of the heat-rays striking, but not passing through, the outer glass door, and the mirror-facing on the inner side of the top extension will serve to deflect the escaping heat downward.

D denotes the boiler, of the form which is best suited for my improved stove. This boiler is of any suitable metal and is flat and thin, as shown, so as to expose a large surface to the incoming heat-rays. To give sufficient room for the reception of articles to be cooked, the boiler is enlarged at its top, as shown, and at the base of the enlargement a screen $d$, to support the articles to be cooked, is provided, said screen being sustained by inwardly-extending ledges $d'$, or otherwise. To enable the boiler to stand properly, it has an extended base $d^2$.

The boiler D sits loosely in the inner box B, and may be removed and an oven E substituted therefor when the stove is to be used for baking. The oven E is of suitable size to loosely fill the inner box B, and is preferably made with compartments, as shown, to support or contain various articles.

Having thus described my invention, I claim and desire to secure by Letters Patent—

1. A solar stove consisting of inner and outer boxes with spaces between them, one side of each of said boxes being of transparent material, substantially as set forth.

2. A solar stove consisting of inner and outer boxes with spaces between them, one side of each of said boxes being transparent and the outer box having a top extension, substantially as set forth.

3. A solar stove consisting of inner and outer boxes with spaces between them, one side of each of said boxes being transparent and the outer box having a top extension with a mirror-facing on its under side, substantially as set forth.

4. A solar stove consisting of inner and outer boxes with spaces between them, one side of each of said boxes being transparent and the outer box having top and side extensions on its transparent side, substantially as set forth.

5. A solar stove consisting of inner and outer boxes with spaces between them, said boxes both having transparent doors, substantially as set forth.

6. A solar stove consisting of inner and outer boxes with spaces between them, and provided with transparent doors, combined with a thin flat removable boiler having an enlarged top and an extended base, substantially as set forth.

7. A boiler for a solar stove, formed thin and flat and having an enlarged top and an extended base, substantially as set forth.

In testimony whereof I affix my signature in presence of two witnesses.

WILLIAM CALVER.

Witnesses:
HENRY CALVER,
EWELL A. DICK.